July 21, 1942.    W. H. HARSTICK    2,290,237
DISCHARGE FOR SEPARATORS
Filed Nov. 29, 1940
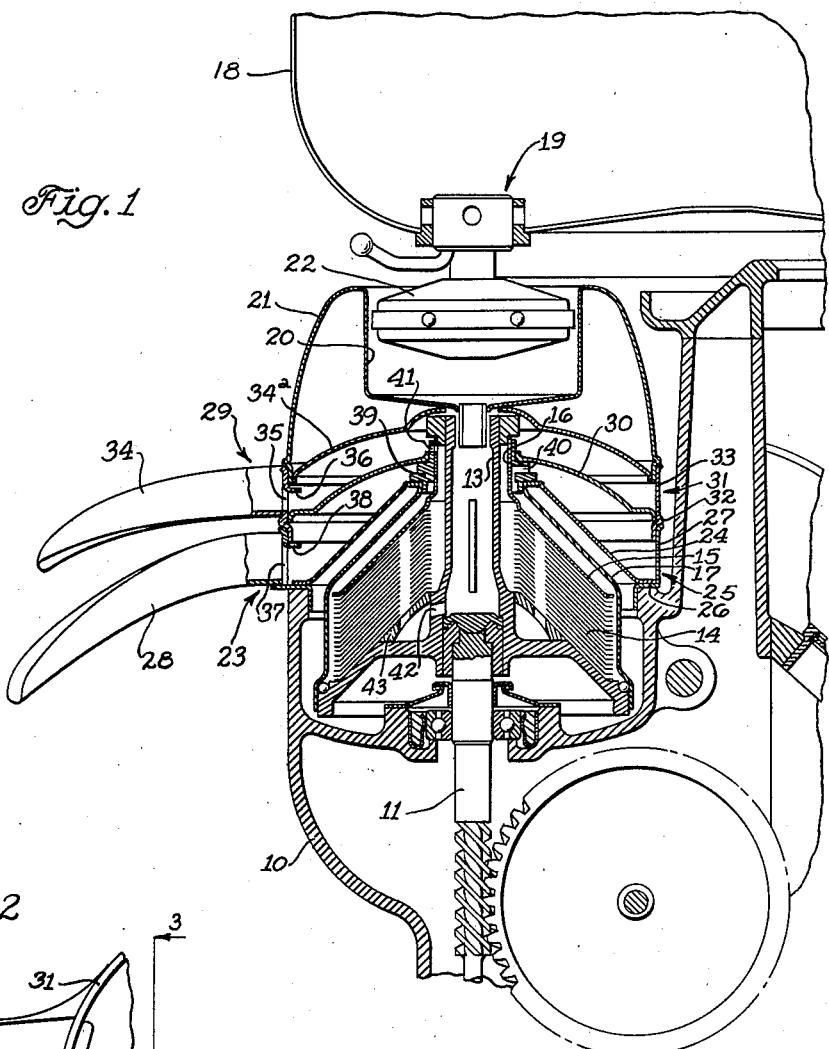
Fig. 1
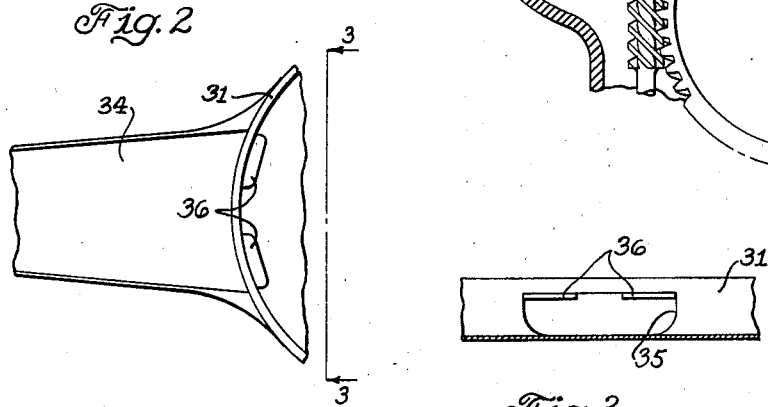
Fig. 2
Fig. 3
Inventor
William H. Harstick
By Paul O. Pippel
Att'y.

Patented July 21, 1942

2,290,237

UNITED STATES PATENT OFFICE 2,290,237

DISCHARGE FOR SEPARATORS

William H. Harstick, Richmond, Ind., assignor to International Harvester Company, a corporation of New Jersey Application November 29, 1940, Serial No. 367,765

6 Claims. (Cl. 233—21)

This invention relates to a discharge for a separator. More specifically it relates to discharge outlets for milk and cream from a cream separator.

The usual cream separator has a pair of discharge outlets in the form of spouts from which milk and cream are discharged separately from the separator. In a good many cases it is advantageous to have the top of the discharge spouts open so that they may be easily inspected and cleaned. It has been discovered that with the top of the spouts open, large bubbles tend to form in the discharging streams of milk and cream, and that these bubbles burst throwing milk and cream about. The cause of these bubbles is apparently in the action of air blowing through a curtain of milk or cream descending over the openings of the covers through which the milk and cream are discharged.

An object of the present invention is to provide an improved separator construction.

A further object is the provision of improved outlet means for fluid discharged from the centrifugal separator.

Another object is to provide suitable discharge outlets for milk and cream from a cream separator.

According to the present invention, each of the discharge outlets for milk and cream for a cream separator is provided with film intercepting means such as a pair of spaced inwardly flanges along the upper side of the outlet.

In the drawing:

Figure 1 is a vertical sectional view through a cream separator;

Figure 2 is a view of a portion of a cover and discharge spout showing the inwardly extending flanges forming the present invention; and, Figure 3 is a sectional view taken along the line 3—3 of Figure 2.

The cream separator shown in Figure 1 includes a supporting casting 10, connected with a base, not shown, which supports the entire separator. Mounted in the casting 10 is a drive spindle 11 upon which is mounted a separator having an upwardly extending tubular portion 13 which is adapted to receive whole milk. A plurality of separator discs 14 is mounted on the base 12. A closing disc 15 is mounted on top of the disks 14 and has an upwardly extending tubular portion 16. A cover 17 is fitted over the disc and is connected to the separator base 12.

A supply can 18 is positioned above the separator and discharges whole milk to a faucet 19 into a well 20 formed in a cover 21. A float valve 22 in the wall 20 regulates the flow of whole milk into the well. There rests on the casting 10 a milk cover 23 comprising a central member 24 of frusto-conical shape, a part 25 having a radially and axially extending flange 26 resting on the casting 10 and a wall 27 extending about the central member 24, and a discharge spout 28 open at the top. A cream cover 29 is mounted on the milk cover 23 and comprises generally the same parts, that is, an upwardly curved central member 30 and a part 31 having a flange 32 fitting within the part 25, a wall portion 33 surrounding the central member 30, and a discharge spout 34 open at its top side. The cream cover is closed by a member 34a secured to the bottom of the cover 21. As seen in all of the figures, there is an opening 35 in the part 31 at the spout 34. Film intercepting means in the form of flanges 36 extend inwardly in spaced relation to one another from the top side of the opening 35. These flanges, which have sufficient peripheral extent or horizontal width to intercept and break any continuous film, may be formed as part of the material of the part 31 removed to form the opening 35 or may constitute separate pieces. The part 25 of the milk cover 23 has a similar opening 37 from the top side of which extend inwardly a pair of spaced flanges 38, of which only one is shown in Figure 1.

A collar 39 rests on the opening in the central member 24 and is provided with a plurality of through passages 40, only one of which is shown, through which milk may pass from the space between the cover 17 and the disc 15 in the milk cover 23. Similarly, a plurality of openings 41, only one being shown, in the top of the collar 39, through which openings cream passes from the separator into the cream cover 29.

In operation of the separator, whole milk is fed from the supply can 18 through the faucet 19 and the well 20 into the central tubular portion 13. It flows from the base thereof through a plurality of openings 42, only one being shown, to the bottom side of a heavy disc 43. Through centrifugal action of the separator, milk passes to the periphery of the discs 14 and up through the space between the disc 15 and the cover 17 and through the passage 40 and is thrown outwardly into the milk cover 23 against the central part 30, flowing outwardly and downwardly therealong and out through the spout 28. Similarly cream passes upwardly between the discs 14 and the central tubular member 13 through the passage 41 and is thrown outwardly into the cream cover 29 against the member 34a, flowing outwardly and downwardly therealong and out through the spout 34.

It was discovered that with no flanges above the openings 35 and 37, through which the milk and cream pass, the milk and cream descending in a curtain as a continuous film form bubbles at the openings 35 and 37 under the action of the air discharged from the separator. Breaking of these bubbles causes milk and cream to be thrown out of the discharge spouts 28 and 34. This drawback was remedied by the provision of flow-interrupting means in the form of the spaced inwardly extending film breaking means such as the flanges 36 and 38 at the top sides of the openings 35 and 37, respectively. These flanges break up the descending curtain of milk and cream so that air may pass through without blowing bubbles and the milk and cream can flow out of the openings 35 and 37 in normal streams. The milk and cream move in a curtain toward the openings with a tangential component to the movement. Thus, as they strike the flanges, they move along them and spill over the edges and are discharged in a manner eliminating the objectionable spattering caused by breaking bubbles.

The action is as follows: When the separator is used for normal skimming, there is an inflow of air through the opening in the cream cover and an outflow of air from the milk cover. The air flowing into the cream cover does not form bubbles, because the quantity of liquid is too small to form a curtain over the opening. The liquid being discharged from the milk spout, being approximately ten times as great as that discharged from the cream spout, would tend to form a descending curtain over the opening, and the outflow of air would blow this curtain out in the form of bubbles.

When the separator is used for standardizing, the relative proportions of quantities are reversed. In this case the largest quantity comes from the cream cover and the smaller quantity from the milk cover. This change in relative quantities also changes the direction of air flow in the covers. Now the air flows outward from the cream cover and into the milk opening. Thus, there would tend to be a curtain over the cream cover opening but none over the milk cover opening.

It will be apparent from the foregoing description that a new and novel construction for a discharge for a separator has been provided. Although the invention as illustrated has been applied to a cream separator, it will be obvious that it may also be applied to other separators. The intention is to limit the invention only within the spirit and scope of the appended claims.

What is claimed is:

1. In a discharge means for a centrifugal separator, comprising a central member having an opening for receiving fluid from the separator and a wall extending about the periphery of the central member and having an opening for discharge of fluid, the combination with the last mentioned opening of a pair of horizontal flanges extending inwardly from the top of the opening in spaced relation to one another.

2. In a discharge means for a centrifugal separator comprising a member having a central opening through which fluid from the separator is received, a wall extending around the member and having an opening, and a discharge spout open on the top extending outwardly from the wall at the opening, the combination with the last mentioned opening and the discharge spout, of a pair of horizontal flanges extending inwardly from the top of the opening in spaced relation to one another.

3. In combination, a stack of separator discs mounted for rotation about a common axis, container means mounted on the separator discs and providing an annular space having its axis coinciding with the axis of rotation of the discs, the container means having an opening in its side, and a spout connected with the container means at the opening, the combination of the spout and the container means, of a pair of horizontal flanges extending inwardly from the upper side of the opening in the container in spaced relation to one another.

4. In a discharge means for a centrifugal separator comprising a member having a central opening through which fluid from the separator is received, a wall extending around the member and having an opening below the said central opening, and a discharge spout open on the top, extending outwardly from the wall at the opening, and an element extending from the member having the central opening to the wall and providing a surface along which the fluid moves outwardly and downwardly to the opening in the wall, the combination with the last mentioned opening and the discharge spout, of a pair of flanges extending from adjacent the top of the opening in spaced relation to one another, said flanges having sufficient peripheral extent to break any continuous film formed by the flow of said liquid over said opening thereby permitting the flow of air therethrough.

5. A fluid receiving and discharge means for a centrifugal separator provided with means for discharging fluid radially from a rotating discharge element comprising annular receiving means provided with a vertical cylindrical wall and a cover extending upwardly and inwardly, said cover being located to receive fluid from the discharge means whereby an outwardly and downwardly flowing film is formed, said cylindrical wall being provided with an opening, an open top discharge spout connected to the wall around said opening, and fluid intercepting means extending substantially at the top of said opening and having sufficient horizontal width to effectively break said film for the flow of air therethrough.

6. A fluid receiving and discharge means for a centrifugal separator provided with means for discharging fluid radially from a rotating discharge element comprising annular receiving means provided with a vertical cylindrical wall and a cover extending upwardly and inwardly, said cover being located to receive fluid from the discharge means whereby an outwardly and downwardly flowing film is formed, said cylindrical wall being provided with an opening, an open top discharge spout connected to the wall around said opening, and fluid intercepting means consisting of a plurality of spaced intercepting elements extending from adjacent the cylindrical wall above the opening and having sufficient horizontal width to effectively break said film for the flow of air therethrough.

WILLIAM H. HARSTICK.